(No Model.)
J. P. DUDLEY.
HORSESHOE.
No. 343,115. Patented June 1, 1886.
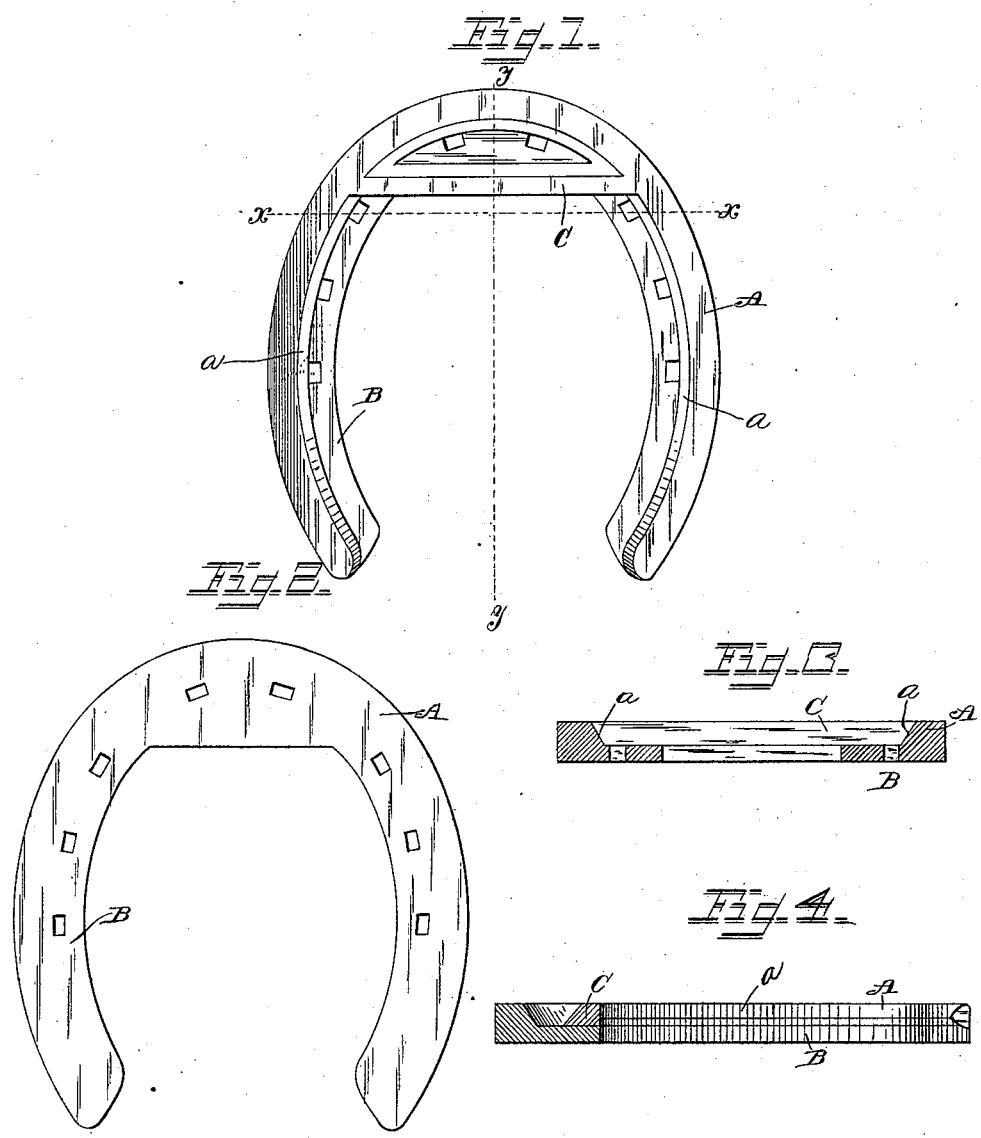
Witnesses
C. J. Schmider
J. Todd McGill
Inventor
John P. Dudley
By Myers & Co.
Attorneys

UNITED STATES PATENT OFFICE.

JOHN P. DUDLEY, OF SAN JOSÉ, CALIFORNIA.

HORSESHOE.

SPECIFICATION forming part of Letters Patent No. 343,115, dated June 1, 1886.

Application filed July 21, 1885. Serial No. 172,236. (No model.)

*To all whom it may concern:*

Be it known that I, JOHN P. DUDLEY, a citizen of the United States of America, residing at San José, in the county of Santa Clara and State of California, have invented certain new and useful Improvements in Horseshoes, of which the following is a specification, reference being had therein to the accompanying drawings.

My improvements in horseshoes is designed to avoid the usual shoe-calk, which ordinarily projects below the plane of the bottom of the shoe and throws the animal's hoof into an inclined and hence unnatural position; to obviate the need of cutting away the hoof to conform it to the shoe, as now practiced, which is detrimental to the hoof; to obtain all the advantages of a shoe-calk, while greatly increasing the durability of the shoe and the traction thereof in hauling heavy loads; to lessen the concussion or jar by presenting a narrow beveled shoe-rim surface to the ground; to admit the outer part of the hoof to have a full bearing-surface upon the shoe, the nails being driven from the inner wall out transversely of the fiber of the hoof to prevent any contraction of the hoof; and it consists in the peculiar construction, combination, and arrangement of the parts, substantially as hereinafter more fully shown and described.

In the accompanying drawings, Figures 1 and 2 are plan views of my horseshoe, the former of the tread-face, and the latter showing the hoof side of the shoe. Fig. 3 is a cross-section on the line $x\ x$; and Fig. 4 is a cross-section on the line $y\ y$, Fig. 1.

In the construction of my horseshoe I form integral with the outer rim, A, of the shoe the narrow interior nail-rim, B, widened at the toe. The nail-rim B, together with the outer rim, A, forms a continuous flat bearing-surface for the animal's hoof, the nail-rim B being interiorly disposed, to enlarge the bearing-surface of the hoof and to admit the nails being driven out from the inner wall through the hoof transversely to the fiber. The bottom of the toe piece or calk C, which is integral with the inner rim, B, and the outer rim, A, is constructed on the same horizontal plane as that of the outer rim, A, and a calk is thus formed, and the shoe upon the hoof strikes the ground as flatly as would the unshod hoof.

The outer rim, A, which is much thicker vertically than the inner rim, B, and hence projects beneath it, is beveled at $a$, in order to narrow the bearing-surface of rim A, thus causing the shoe not only to take better hold upon the surface earth, but to act as a continuous shoe-calk in conjunction with the toe piece or calk C and to wear out uniformly, thus rendering the shoe more durable.

I am aware that it is not new to construct a horseshoe having a continuous tapered calk diminishing in width from near the toe to the heel, a horseshoe having a flat toe-piece extending to the extreme front, and a continuous ridge extending around the central part of the base, and a horseshoe gradually decreasing in thickness from toe to heel, and provided with a continuous calk along the outer edge of the bottom of the shoe; also a horseshoe having a continuous calk and continuous stiffening-rib; but none of the above-described horseshoes accomplish the purpose for which my invention is intended—namely, an increased bearing-surface for the animal's hoof by so forming, in connection with the nail-rim and the beveled narrow outer rim, an integral calk on the same plane with said outer rim, as hereinbefore fully described.

Having thus fully described my invention, what I claim, and desire to secure by Letters Patent, is—

A horseshoe for increasing the bearing-surface for the animal's foot, consisting of a calk, an inner nail-rim, and a narrow outer rim, said calk being formed integral with the nail-rim and at its ends with the narrow outer rim, said outer rim and calk being on the same plane, substantially as shown and described.

In testimony whereof I affix my signature in presence of two witnesses.

JOHN P. DUDLEY.

Witnesses:
C. C. REDMOND,
H. W. WRIGHT.